July 30, 1940. J. FILKO 2,209,599
SWITCH MECHANISM FOR MOTOR VEHICLE SIGNALS
Filed Aug. 29, 1938 2 Sheets-Sheet 1
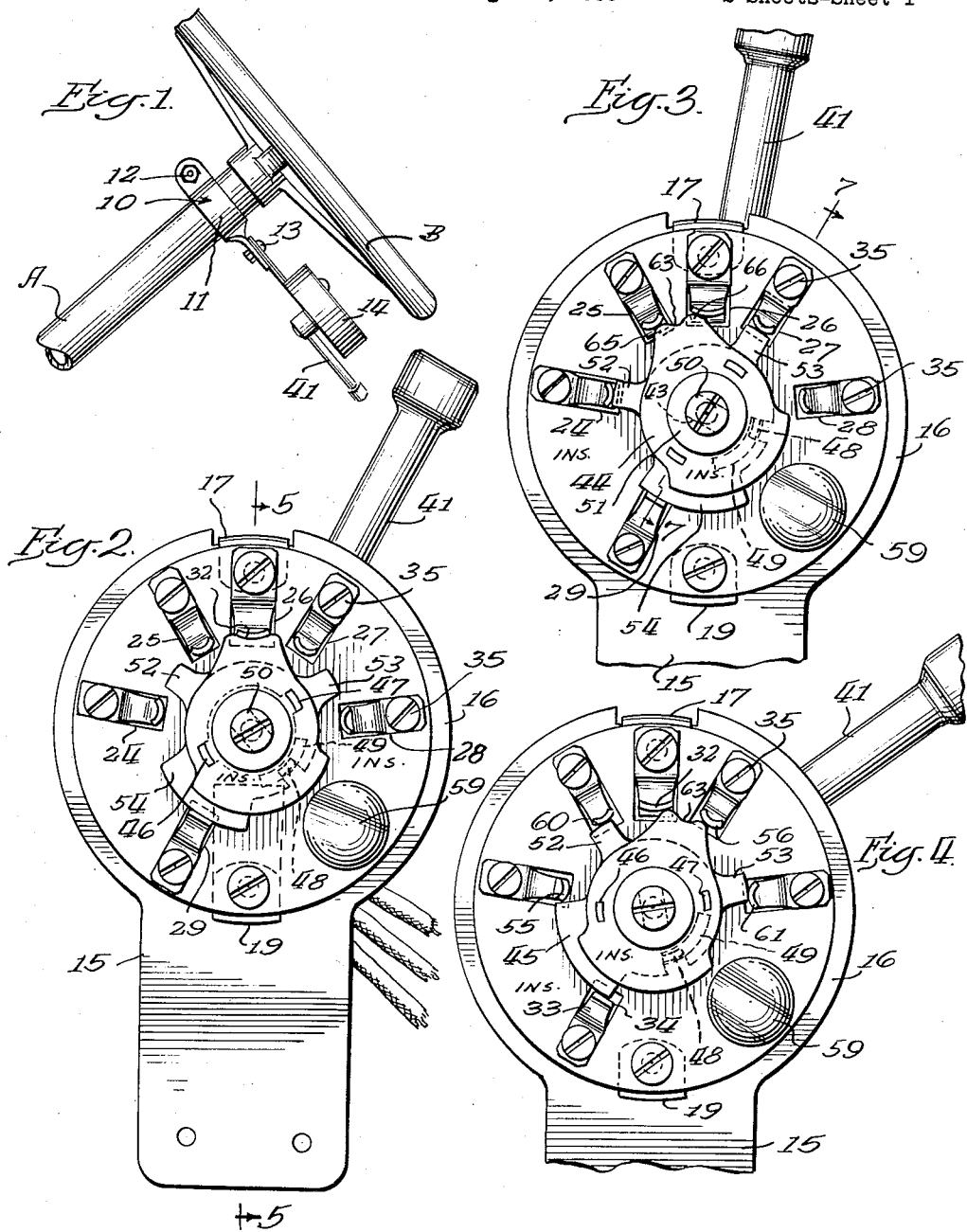

July 30, 1940.　　　　J. FILKO　　　　2,209,599
SWITCH MECHANISM FOR MOTOR VEHICLE SIGNALS
Filed Aug. 29, 1938　　　2 Sheets-Sheet 2
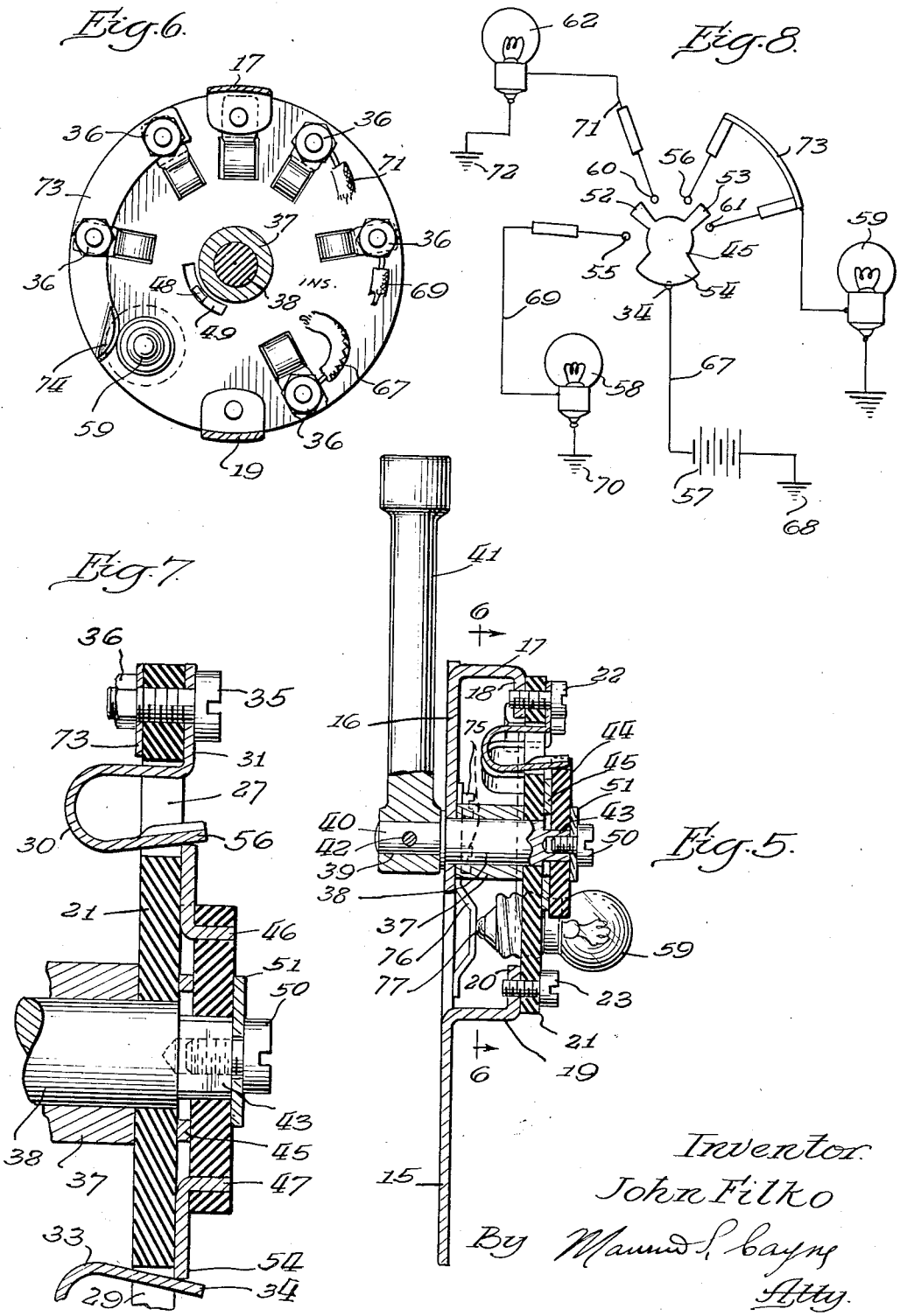

Patented July 30, 1940

2,209,599

UNITED STATES PATENT OFFICE 2,209,599

SWITCH MECHANISM FOR MOTOR VEHICLE SIGNALS

John Filko, Chicago, Ill.

Application August 29, 1938, Serial No. 227,285

9 Claims. (Cl. 200—8)

This invention relates generally to an improved switch mechanism, and more particularly, to a mechanism of this character adapted for use in connection with forward and rear motor vehicle signals.

An object of this invention is the design of a switch mechanism of the above-mentioned character, which will result in a simpler construction, and one susceptible of cheaper and easier manufacture, as well as a more durable construction, so assembled, as to eliminate the danger of the same readily getting out of order.

It is the further object of this invention to provide an improved switch mechanism of the character described, mounted on the steering column of the vehicle, thereby rendering it easily operable by the operator of the vehicle, said mechanism including means for indicating to the operator whether or not the various signals arranged for operation by the switch mechanism are operating.

With the foregoing and other objects in view which will appear as the description proceeds, the invention consists in certain novel features of construction, arrangement and combination of parts hereinafter fully described, illustrated in the accompanying drawings, and particularly pointed out in the appended claims, it being understood that various changes in the form, proportion, size and minor details of the structure may be made without departing from the spirit or sacrificing any of the advantages of the invention.

For the purpose of facilitating an understanding of my invention, I have illustrated in the accompanying drawings, a preferred embodiment thereof, from an inspection of which, when considered in connection with the following description, my invention, its mode of construction, assembly and operation, and many of its advantages should be readily understood and appreciated.

Referring to the drawings in which the same characters of reference are employed to indicate corresponding or similar parts throughout the several figures of the drawings:

Fig. 1 is a view in perspective of a portion of a steering column of a motor vehicle showing my improved switch mechanism associated therewith;

Fig. 2 is a front elevational view of the same, with the switch mechanism being shown in open position;

Fig. 3 is a view similar to Fig. 2, with the switch mechanism being shown in one circuit closing position;

Fig. 4 is a view similar to Fig. 2, with the switch mechanism shown in a different circuit closing position;

Fig. 5 is a longitudinal, sectional view taken substantially on line 5—5 of Fig. 2;

Fig. 6 is a sectional view taken substantially on line 6—6 of Fig. 5;

Fig. 7 is a sectional view taken substantially on line 7—7 of Fig. 3;

Fig. 8 is a diagrammatic view of the electrical connections for my improved switch mechanism.

Referring to the drawings more specifically by characters of reference, I have illustrated a steering column A of a motor vehicle, with the usual form of steering wheel B mounted thereon. Attached to the steering column adjacent the steering wheel, I provide a bracket 10 comprising a pair of straps 11, the free ends of which are detachably secured to each other by means of the screw 12. The bracket 10 is adapted for engagement around the steering column A, and has detachably secured thereto, as shown at 13, my improved switch mechanism, generally designated by the reference character 14.

I provide for my improved switch mechanism a supporting member 15 of any suitable material, such as metal or the like, which member comprises a substantially circular portion 16 and a depending substantially rectangular portion 16. Adjacent the upper end, as viewed in Fig. 2 of the circular portion 16, I provide a lug 17, formed integral with the portion 16, the free end of which lug is bent downwardly to form an ear 18, which is arranged substantially parallel to the portion 16.

A second lug 19 is punched out of the portion 16 adjacent its lower end, said lug being also provided with an ear 20 arranged substantially diametrically opposed to the ear 18 and being substantially parallel to the portion 16.

The two lugs, 17 and 19, provide a suitable support for the base 21 of my improved switch mechanism, which base is constructed of suitable insulating material and is secured to the lugs 17 and 19 by means of screws 22 and 23 extending through said insulating base 21 and through threaded openings provided therefor in the lugs 17 and 19, respectively.

The insulating base 21 is of substantially circular formation and has provided therein a plurality of radial slots circumferentially spaced, said slots being designated by the reference characters 24, 25, 26, 27, 28 and 29. Disposed in each of said slots is a spring metal contact of substantially U-shaped formation designated generally by the reference character 30 and formed with an extension 31, by means of which extension the said spring contacts 30 are secured to the upper face of the insulating base 21. The assembly is such, that the major portion of the U-shaped contact will extend within the space formed between the insulating support 21 and the metal portion 16 of the supporting member 15, as shown more clearly in Figs. 5 and 7 of the drawings.

The upper portion of the legs of the contacts 30, with the exception of one of said spring contacts to be later referred to, is bent to a substantially U-shaped cross-section, as shown at 32 in Figs. 4 and 7, for a purpose to be presently more fully described. The remaining contact, which is designated by the reference character 33, has its contact portion, as shown at 34, substantially flat instead of curved as the others, also for a purpose to be presently more fully described.

It will be noted, as shown in the drawings, that these contact points 32 and 34 of said spring contact members are arranged when in assembled position on the insulating plate 21 to extend a short distance above the outer face of the supporting member 21, as shown more clearly in Figs. 5 and 7. By reason of the U-shaped construction of said contacts 30 and the resiliency of the metal out of which said contacts are formed, the contact portions 32 thereof will be normally urged towards the end of the slot within which they are mounted, as shown in Fig. 2 of the drawings. Each of said contacts is detachably secured in operative position on the insulating plate 21, by means of the screws 35 passing through the horizontal extensions 31 and through the body of the insulating plate 21. Suitable nuts 36, cooperate with each of said screw members 35 for securely locking the same in operative position. It will be noted, however, that the contact disposed immediately adjacent the lug 17 will be held in place by means of the screw 22, as shown in Figs. 5 and 7.

Disposed between the portion 16 of the supporting member and the insulating plate 21, is a metal sleeve or bushing 37, said bushing being effective for spacing the central portion of the members 16 and 21, and also forming a bearing for the stub shaft 38, which shaft extends through a central opening formed therefor in the plate portion 16, and a similar opening in the insulating plate 21. That portion of the shaft 38 extending beyond the plate portion 16 is provided with a shoulder 39 and a reduced portion 40, upon which reduced portion is adapted to be mounted the operative lever 41, which lever is keyed to the shaft by means of the pin 42. The portion of the shaft 38 extending beyond the insulating plate 21 has provided thereon a substantially rectangular shaped extension 43, which may be formed by filing away opposed sides of the shaft end. Said squared end or extension 43 of the shaft is adapted to receive thereon an insulating member 44, said member being provided with a central square-shaped opening adapted to fit over the squared end of the shaft, whereby said member 44 will rotate with the shaft when the latter is actuated by the lever 41.

Disposed between the insulating member 44 and the insulating base 21 is a metal contact member 45, which member is provided with a central opening of substantially circular formation and of such a size as to prevent its coming in contact with any portion of the shaft 38.

The member 45 is provided with a pair of upstanding lugs 46 and 47 struck up from the body of the member and are received within similarly shaped slots formed in the insulating rotor 44, whereby said members 44 and 45 will be secured to each other so as to move as a unit. The member 45 is also provided with a downwardly extending lug 48 which is adapted for disposition in an elongated slot 49 provided in the insulating support 21. The purpose of the lug 48 and slot 49 is to not only limit the rotary movement of the member 45, but also to prevent any lateral movement of the member 45 which might cause it to come in contact with any portion of the shaft 43.

The members 44 and 45 are secured in operative position to the supporting plate 21 and the shaft 38 by means of the screw 50, which is threaded into a threaded opening provided in the free end of the squared portion 43 of the shaft 38. A suitable washer 51 may be interposed between the insulating rotor 44 and the head of the screw member 50. The rotary contact member 45 is provided with radial projections or contacts 52, 53 and 54, the contact 54 being of such circumferential length as to always remain in contact with the spring contact 34 within the limits of the throw of the lever 41.

The contact 52 is adapted for engagement with the contact 55 when in the position shown in Fig. 3, at which time it will be noted that the contact 53 will be in contacting engagement with the contact 56, whereby a circuit will be closed from the battery 57 to the lamp 58, which lamp will indicate, for example, a right-hand turn, and also a circuit will be closed to the lamp 59, which lamp is also mounted on the insulating support 21 for indicating to the driver that the signal system is in operation. Similarly, when the lever is actuated and moved to the position shown in Fig. 4, it will be noted that the contact 52 will engage contact 60 and contact 53 will engage contact 61, the contact 54, of course, remaining in contact with the spring contact 34, as shown in Fig. 4. In this position, a circuit will be closed to the lamp 62, which may indicate a left-hand turn, as well as a circuit to the lamp 59 through the contacts 53 to 61.

Thus, it will be seen, that in either of the two last-mentioned positions of the lever 41, a circuit to the indicating lamp 59 will be closed. The rotor 45 is also adapted to be moved by the lever 41 to a neutral or circuit opening position, which position is illustrated in Fig. 2, and in which position it will be noted that the contacts 52 and 53 are disposed between the contacts 55 and 60, and 56 and 61, respectively, so as to be out of engagement therewith, and at the same time there is provided on the insulating rotor 44 a suitable notch 63, which is adapted for engagement by the portion 32 of the U-shaped spring member 30, as shown more clearly in Fig. 2, for maintaining said rotor in this position so that it will require positive operation of the lever 41, in order to move the switch elements to the other positions shown in Figs. 3 and 4.

Similarly, it will also be noted that when the lever 41 has been moved to the position shown in Fig. 3, it will be maintained in said position against accidental movement by reason of the portions 65 and 66 of the insulating rotor 44 being in engagement with the portion 32 of the member 30, and the spring contact 60. When the lever is moved to the position shown in Fig. 4, it will be noted that it will be retained in said position by reason of said portions 65 and 66 being in engagement with the portion 32 of the spring member 30 and the contact 56. Thus, it will be noted that the rotatable contact member 45 and its associated insulating member 44 will be maintained and held in the position to which the same is moved by the lever 41 and that positive movement by the operator of the vehicle is required to move the said elements from any position that they may be in to some other position.

The screws 35 with their associated nuts 36 may be utilized as binding posts for electric conductors connecting the switch mechanism in the various electric circuits. Thus, one of said conductors 67 is connected to the spring contact 33, said conductor 67 leading to a source of electrical energy such as the pole of the battery 57, the other pole of which is grounded, as shown at 68. Similarly, a conductor 69 is connected to the spring contact 55, said conductor leading to the lamp 58, which is grounded as shown at 70. The third conductor 71 is connected with the spring contact 60, which leads to the lamp 62, which lamp is grounded, as shown at 72.

The contacts 56 and 61 are connected to each other by means of a metal strip 73 connected to the under side of the insulating plate 21, as shown in Fig. 6, the free end of said plate member 73 being bent into contacting engagement with the bulb 59, as shown at 74. Secured to the metal portion 16 of the supporting plate by means of the screws 75 is a strip of metal 76, said strip being bent, as shown in Fig. 5, and is adapted to have a yielding contact with the point 77 of the lamp 59 when the lamp is screwed in position within the insulating supporting plate 21. The plate 76, above-described, forms the ground for the lamp 59, which lamp is, as already stated, an indicating lamp, and is arranged in a circuit common to both of the circuits to the signal lamps, whereby said lamp will be illuminated by the closing of any of the above circuits.

As shown in Fig. 1, my improved switch mechanism is adapted for detachable engagement with the bracket secured to the steering column, and when so secured in place will be so disposed that the lever 41 may be readily actuated by the operator of the vehicle.

If desired, a suitable cover member may be disposed over the switch mechanism, in which case the indicating lamp 59 will either extend through an opening in said cover member so that the same may be readily observed by the operator, or a transparent covering may be provided for the cover member through which the indicating lamp may be observed.

The operation of my improved switch mechanism should be readily apparent from the above description. The actuation of the lever 41 may be readily effective for closing the circuit to either the left-turn signal lamp or the right-turn signal lamp, and when either of said circuits are closed, the circuit to the indicating lamp, which is common to both of the above-mentioned circuits, will also be closed.

It will also be noted that the contacts which are moved by the actuation of the lever 41 are so arranged with respect to their cooperating fixed contacts as to maintain the switch mechanism securely in any position to which the same is moved. In other words, once a circuit is closed, the movable and fixed contacts cooperating to close the circuit will cooperate with each other to maintain the parts against any accidental movement, and will remain in such position until further positive operation of the lever by the operator of the vehicle.

It will also be noted that this is equally true of the parts when the switch mechanism is moved to its neutral position, in which position all of the circuits are open. This feature is of the greatest importance in a switch mechanism of this character, as the vibration of the vehicle while in operation would otherwise either cause the contacts to be jarred out of engagement with each other, thereby causing an opening of the circuit desired to be closed, or causing said contacts to be loosely held in engagement with each other, which would result in serious injury to the contacts due to arcing and the like.

It will further be noted that my improved switch mechanism includes only a few simple parts that may be readily assembled, and when so assembled will be highly efficient for carrying out the purposes for which it is designed.

It is believed that my invention, its mode of construction and assembly, and many of its advantages should be readily understood from the foregoing without further description, and it should also be manifest that while a preferred embodiment of the invention has been shown and described for illustrative purposes, the structural details are nevertheless capable of wide variation within the purview of my invention as defined in the appended claims.

I claim:

1. A switch mechanism of the character described, comprising a supporting plate member provided with a pair of upstanding lugs, an insulating plate supported on said lugs, said insulating plate being provided with a plurality of circumferentialy spaced radial slots, a substantially U-shaped spring contact disposed in each of said slots, one end of said contacts being secured to said insulating plate and the other free end of said contacts being arranged to extend above the outer surface of said insulating plate and to be normally urged against the inner edge of said slot, a rotatable shaft mounted centrally of said supporting members for rotation relative thereto, a rotor of conducting material connected to said shaft but insulated therefrom for rotation therewith, said rotor being provided with peripheral projections for selective contacting engagement with said first-mentioned contacts, the means connecting said rotor to said shaft being effective for maintaining said rotor in any position to which it may have been moved by the actuation of said shaft, and a lever for actuating said shaft.

2. A switch mechanism of the character described, comprising a supporting plate member, an insulating plate supported on said plate member in spaced relation thereto, said insulating plate being provided with a plurality of circumferentially spaced radial slots, a substantially U-shaped spring contact disposed in each of said slots, one end of said contacts being secured to said insulating plate and the other free end of said contacts being arranged to extend above the outer surface of said insulating plate and to be normally urged against the inner edge of said slot, a bushing interposed between said plate members, a rotatable shaft mounted in said bushing for rotation relative to said plate members, a rotor of conducting material arranged on the outer surface of said insulating plate, an insulating member connecting said rotor with said shaft whereby rotation of said shaft will impart corresponding rotary movement to said rotor, said rotor being provided with peripheral projections for selective contacting engagement with said first-mentioned contacts, said last-mentioned insulating member having means provided thereon for cooperation with said first-mentioned contacts to maintain the rotor in any position to which it may have been moved by the actuation of said shaft, and a lever for actuating said shaft.

3. A switch mechanism of the character described, comprising a supporting plate member, an insulating plate supported on said first member in spaced relation thereto, said insulating plate being provided with a plurality of circumferentially spaced radial slots, a substantially U-shaped spring contact disposed in each of said slots with their U-shaped portions extending into the space between said supporting members, means securing said spring contact members to said insulating plate member and when so secured the inner leg portion of said U-shaped contact members will be normally urged against the inner edge of said slot with the free end thereof being disposed above the outer surface of said insulating plate, a rotatable shaft mounted centrally of said supporting members for rotation relative thereto, a rotor comprising a portion of insulating material super-imposed upon a portion of conducting material secured to said shaft for rotation therewith, said rotor being arranged against the outer surface of said insulating plate and being provided with peripheral projections for selective contacting engagement with said first-mentioned contacts, said insulating portion of said rotor having means provided on the periphery thereof for cooperation with said first-mentioned contacts for maintaining said rotor in any position to which it may have been moved by actuation of said shaft, and a lever for actuating said shaft.

4. A switch mechanism of the character described, comprising a supporting plate member, an insulating plate mounted on said plate member in spaced relation thereto, said insulating plate being provided with a plurality of circumferentially spaced radial slots, a substantially U-shaped spring contact disposed in each of said slots with the major portion of the body of said contact arranged in the space formed between said two supporting members, one end of said contacts being secured to said insulating plate and the other free end of said contacts being arranged to extend above the outer surface of said insulating plate and to be normally urged against the inner edge of said slot, a rotatable shaft mounted centrally of said supporting members for rotation relative thereto, that portion of the shaft extending beyond the insulating plate being provided with a squared end and having mounted thereon for rotation therewith a rotor of insulating material, a rotor of conducting material arranged between said insulating plate and said insulating rotor and being connected to the latter for movement therewith, the means connecting said conducting rotor to said insulating rotor being effective for maintaining said conducting rotor out of contacting engagement at all times with said shaft, said conducting rotor being provided with peripheral projections for selective contacting engagement with said first-mentioned contacts, and said insulating rotor being provided with means on the periphery thereof adapted for engagement with certain of said first-mentioned contacts for maintaining said rotor in any position to which it may have been moved by actuation of said shaft, and means for actuating said shaft.

5. A switch mechanism of the character described, comprising a supporting plate member, an insulating plate supported on said plate member in spaced relation thereto, a plurality of substantially U-shaped spring contacts carried by said insulating plate, said contacts being arranged in circumferentially spaced relation to each other, a rotatable shaft mounted in said supporting members centrally thereof for rotation relative thereto, a rotor of conducting material arranged on the outer surface of said insulating plate, means connecting said rotor for rotation with said shaft, said means insulating said rotor from said shaft, said rotor being provided with peripheral projections for selective contacting engagement with said first-mentioned contacts, and means carried by said first-mentioned insulating plate adapted for engagement with said last-mentioned means for maintaining the switch mechanism in a neutral position against accidental movement thereof.

6. A switch mechanism of the character described, comprising a supporting plate member, an insulating plate supported on said plate member in spaced relation thereto, a plurality of substantially U-shaped spring contacts carried by said insulating plate, said contacts being arranged in circumferentially spaced relation to each other, a rotatable shaft mounted in said supporting members centrally thereof for rotation relative thereto, a rotor of conducting material arranged on the outer surface of said insulating plate, means connecting said rotor for rotation with said shaft, said means insulating said rotor from said shaft, said rotor being provided with peripheral projections for selective contacting engagement with said first-mentioned contacts, means carried by said first-mentioned insulating plate adapted for engagement with said last-mentioned means for maintaining the switch mechanism in a neutral position against accidental movement thereof, said last-mentioned means including a substantially U-shaped spring member having its body portion extending into the space between the first-mentioned plate members, one end of said spring member being secured to said insulating plate and the other free end thereof being arranged so as to extend above the upper surface of said insulating plate.

7. A switch mechanism of the character described, comprising a supporting plate member provided with a pair of upstanding lugs, an insulating plate supported on said lugs, said insulating plate being provided with a plurality of circumferentially spaced radial slots, a substantially U-shaped spring contact disposed in each of said slots, one end of said contacts being secured to said insulating plate and the other free end of said contacts being arranged to extend above the outer surface of said insulating plate and to be normally urged against the inner edge of said slot, a rotatable shaft mounted centrally of said supporting members for rotation relative thereto, a rotor of conducting material connected to said shaft but insulated therefrom for rotation therewith, said rotor being provided with peripheral projections for selective contacting engagement with said first-mentioned contacts, the means connecting said rotor to said shaft being effective for maintaining said rotor in any position to which it may have been moved by the actuation of said shaft, means for positively limiting the rotary motion of said rotor comprising lug means associated with said rotor extending into means provided on said insulating plate, and a lever for actuating said shaft.

8. A switch mechanism of the character described, comprising a supporting plate member, an insulating plate supported on said plate member in spaced relation thereto, a plurality of substantially U-shaped spring contacts carried by said insulating plate, said contacts being arranged in circumferentially spaced relation to each other, a rotatable shaft mounted in said supporting members centrally thereof for rotation relative thereto, a rotor of conducting material arranged on the outer surface of said insulating plate, means connecting said rotor for rotation with said shaft, said means insulating said rotor from said shaft, said rotor being provided with peripheral projections for selective contacting engagement with said first-mentioned contacts, means carried by said first-mentioned insulating plate adapted for engagement with said last-mentioned means for maintaining the switch mechanism in a neutral position against accidental movement thereof, and means for positively limiting the rotary motion of said rotor comprising lug means associated with said rotor extending into means provided on said insulating plate.

9. A switch mechanism of the character described, including a supporting plate member provided with upstanding lugs, an insulating plate supported on said lugs, contacts being circumferentially disposed about said insulating plate, a rotatable shaft mounted centrally of said supporting plate member for rotation relative thereto, a rotor of conducting material connected to said shaft but insulated therefrom for rotation therewith, said rotor having means thereon for selective cooperation with said contacts as same is rotated, and means for positively limiting the rotative motion of said rotor comprising a lug member associated with said rotor, said lug member cooperating with an arcuate slot provided in said insulating member, the extent of said slot being proportional to the degree of rotation of which said rotor is capable.

JOHN FILKO.